United States Patent [19]

Takayama et al.

[11] Patent Number: 4,716,879
[45] Date of Patent: Jan. 5, 1988

[54] FUEL INJECTION SUPPLY SYSTEM FOR MULTI-CYLINDER INTERNAL COMBUSTION ENGINE

[75] Inventors: Teruo Takayama; Teruo Yamauchi, both of Katsuta, Japan

[73] Assignee: Hitachi, Ltd., Tokyo, Japan

[21] Appl. No.: 844,342

[22] Filed: Mar. 26, 1986

[51] Int. Cl.⁴ .................................. F02M 29/00
[52] U.S. Cl. .............................. 123/590; 123/472
[58] Field of Search ................. 123/590, 472, 478

[56] References Cited

U.S. PATENT DOCUMENTS

| | | | |
|---|---|---|---|
| 4,105,004 | 8/1978 | Asai | 123/590 |
| 4,237,836 | 12/1980 | Tanasawa et al. | 123/472 |
| 4,590,915 | 5/1986 | Yamauchi et al. | 123/590 |

*Primary Examiner*—E. Rollins Cross
*Attorney, Agent, or Firm*—Antonelli, Terry & Wands

[57] ABSTRACT

A fuel injection supply system for an internal combustion engine provided with an even number more than four cylinders. The first intake manifold is connected to the first cylinder group comprising one half of the cylinders and the second intake manifold is connected to the second cylinder group comprising the other half of the cylinders. A passage collector member is provided which collects the intake passages so as to communicate the intake ports of the first and second manifolds each other, and the first fuel supply device is disposed at the converging portion of the first intake manifold and the second fuel supply device is disposed at the converging portion of the second intake manifold.

7 Claims, 6 Drawing Figures

FUEL INJECTION SUPPLY SYSTEM FOR MULTI-CYLINDER INTERNAL COMBUSTION ENGINE

FIELD OF THE INVENTION AND RELATED ART STATEMENT

The present invention relates to a fuel supply system for a multi-cylinder internal combustion engine and, more particularly, to a fuel injection supply system having almost horizontally extending intake passages within each of which is provided a fuel supply means comprising a fuel injection valve and an atomizing device.

Previously, in fuel supply systems for automobile engines, fuel injection systems have prevailingly been adopted because they are advantageous for the purposes of increasing engine power, purifying exhaust gases, economizing fuel expenses, improving operating performances, corresponding to users' trend toward higher-class machines, etc. Among the proposed fuel supply systems are a multi-point fuel injection system of the type disclosed in, for example, Japanese Patent Unexamined Publication No. 144632-'83 which is provided with one fuel injection valve for each cylinder and a single-point fuel injection system such as, for example, disclosed in Japanese Patent Unexamined Publication No. 23266-'83 having a fuel injection valve mounted to an intake manifold on the upstream side of converging portion thereof.

The multi-point fuel injection system, however, suffers from a disadvantage that its cost becomes rather high since each cylinder requires its own fuel injection valve. Another drawback is that, by this system, fuel is injected close to the intake valve of the engine so that, when fuel has entered the combustion chamber, fuel density distribution within the chamber is easy to lose its uniformity, thus necessarily causing worsened combustion, lowered thermal efficiency and deteriorated economy of fuel expenses.

On the other hand, the single-point fuel injection system is relatively lower in its cost since only one fuel injection valve is necessary. This system, however, also suffers from its inherent drawback in that it is prone to give rise to unbalanced air-fuel ratios among respective cylinders, which tends to result in lowered engine power, deteriorated fuel economy and operating performances.

SUMMARY OF THE INVENTION

Accordingly, the present invention aims to provide an innovated fuel injection supply system which completely eliminates all the drawbacks inevitable in both the conventional multi-point and single-point fuel injection systems noted above.

This invention is characterized in that an even number more than four cylinders are divided into two halves thereby constituting the first and second groups of cylinders, that the first and second intake manifolds are provided which respectively collect the intake passages of the first cylinder group and the intake passages of the second cylinder group and that fuel supply means, each comprising a fuel injection valve and an atomizing device are arranged in mutually parallel relationship upstream of converging portions of the respective intake manifolds.

DETAILED DESCRIPTION OF PREFERRED EMBODIMENTS

Now, the invention will be explained with reference to its exemplary embodiments in the following.

Figure 1:
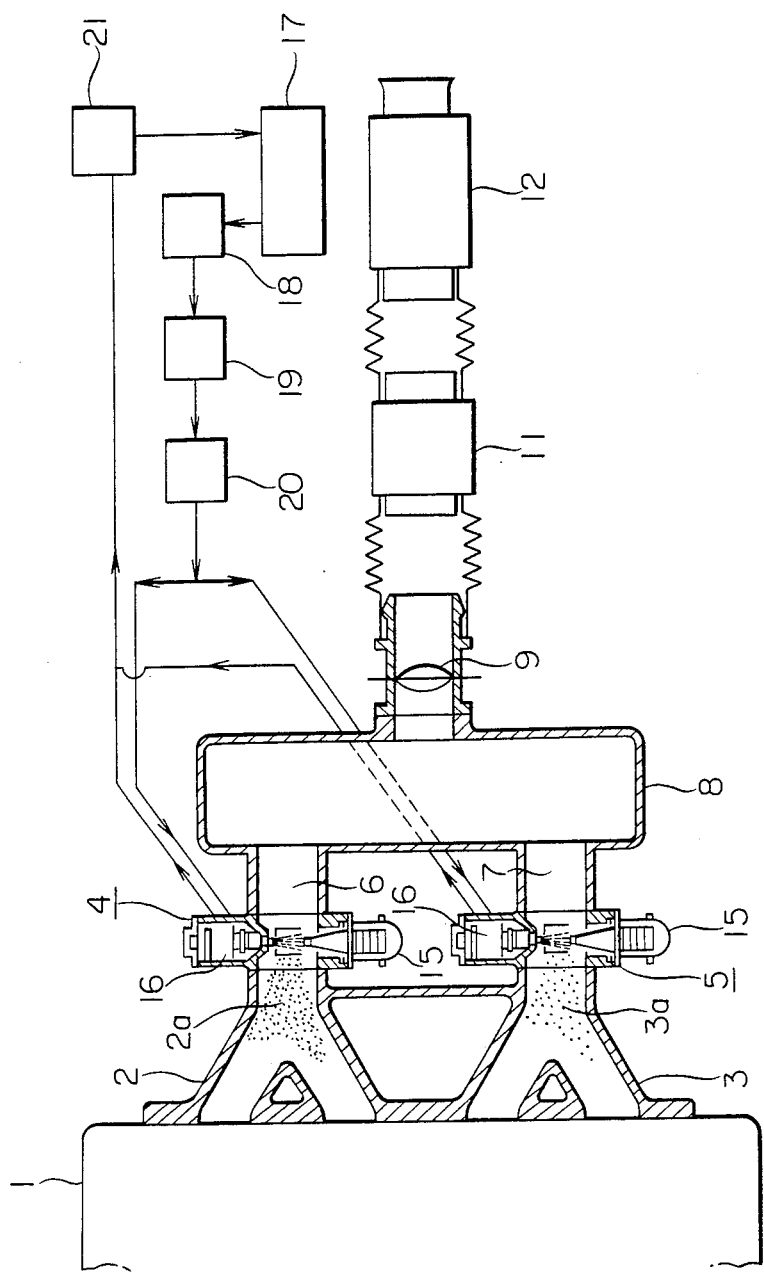
FIG. 1 is a partially sectioned block diagram illustrating a preferred embodiment of a fuel supply system with a fuel atomizing device according to the present invention.
Figure 2:
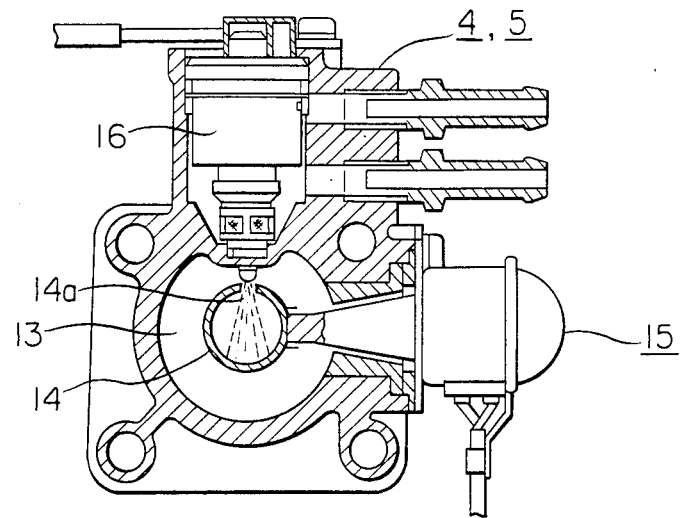
FIGS. 2 and 3 are vertically and horizontally sectioned views of essential portions of a fuel supply means according to the present invention.
Figure 3:
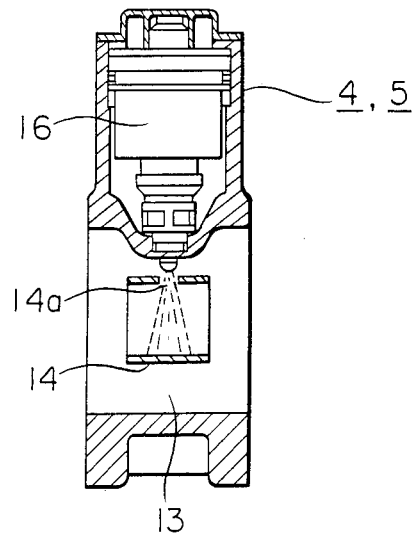

Referring to FIG. 1, an internal combustion engine 1 is provided comprising four cylinders of which a pair of the first and second cylinders constitute the first cylinder group connected to the first intake manifold 2 and another pair of the third and fourth cylinders constitute the second cylinder group connected to the second intake manifold 3. The intake manifolds 2, 3 are connected, upstream of converging portions 2a, 3a thereof, respectively to the first and second fuel supply means 4, 5 which, in turn, are connected to a passage collector member 8 respectively by way of passages 6, 7 extending in parallel to each other from said collector member 8. A throttling valve 9 is disposed upstream of the passage collector member 8, and an air flow meter 11 and an air cleaner 12 are disposed in sequence further upstream of the throttling valve 9. As can be seen from FIGS. 2 and 3, the first and second fuel supply means 4, 5 are constructed such that there is provided an atomizing device 15 mounted so as to have a tubular hollow vibrating piece 14 positioned approximately in the central portion of an air intake passage 13, with the tubular hollow vibrating piece 14 being formed with a transverse bore 14a through its side wall, and, at a location so close to said transverse bore 14a so as to enable fuel to pass therethrough, a fuel injection solenoid valve 16 is provided which is arranged to inject fuel in the direction almost at right angles to the axis of said tubular hollow vibrating piece 14.

Besides, from the first and second intake manifolds 2, 3 to the first and second fuel supply means 4, 5, the respective air intake passages are positioned to extend almost horizontally.

With the arrangements described above, fuel can be delivered to each fuel injection valve 16 by a fuel pump 18 from a fuel tank 17 through a fuel filter 19 and a damper which is adapted to take up possible fuel pressure pulsations and fuel can be returned through a fuel pressure regulator 21 to the fuel tank 17.

In this first embodiment of the invention, the valve opening duration for the fuel injection valve 16 is determined such that the amount of fuel delivered should correspond to the value of the intake air mass flow measured at the intake flow meter 11 divided by the number of revolutions. The respective fuel injection valves 16 for the fuel supply means 4, 5 may be arranged to open either concurrently or in synchronized relation with associated air intake valves for the respective cylinders. The controlling for such valve operations can be accomplished by any type of conventional fuel injection system.

The atomizing device 15 incorporated in the embodiment is of a construction wherein the tubular hollow vibrating piece 14 is caused to oscillate by ultrasonic waves and fuel injected out of the fuel injection valve 16 is atomized by such ultrasonic oscillations instantly when it impinges against the tubular hollow vibrating piece 14.

Figure 4:
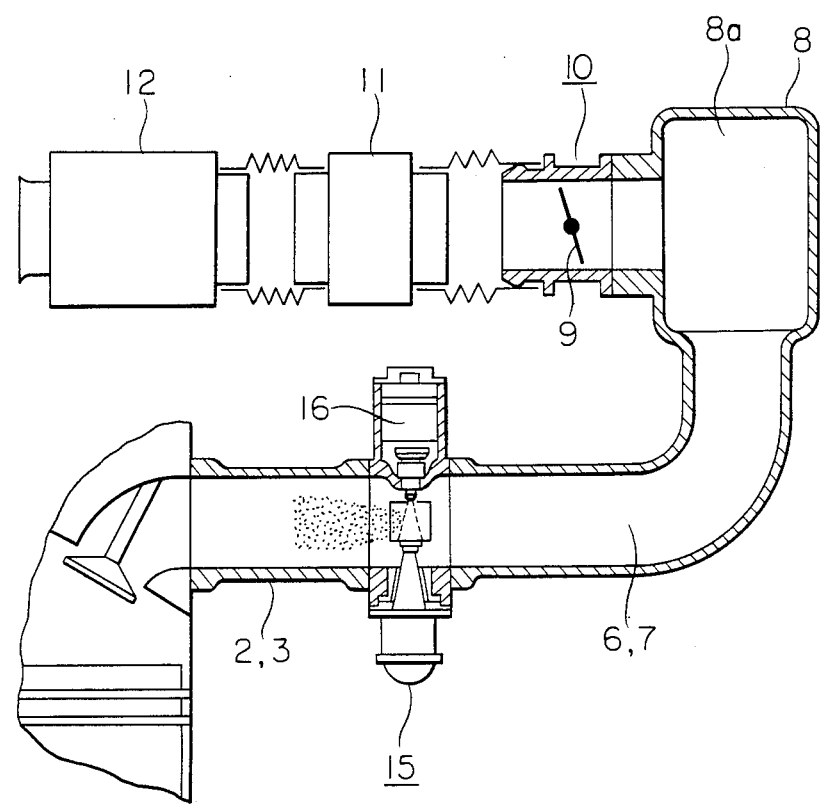
FIGS. 4 to 6 inclusive are block diagrams partially showed in vertical sections respectively illustrating other modified embodiments according to the present invention.

FIG. 4 illustrates a modified embodiment of the present invention in which the direction of the intake passage extending from the intake manifolds 2, 3 to the air cleaner 12 has been changed as a result of a modified location of the passage collector member 8. This configuration lends itself to easier arrangement of related components yet providing the effect similar to that described above. Furthermore, by arranging the parallel passages 6, 7 leading to a passage collecting portion 8a such that the latter is disposed over the former as can be seen in FIG. 4, an additional effect is obtained which contributes to suppression of reversed fuel flow caused by back fire and blow back phenomina from the engine.

Figure 5:
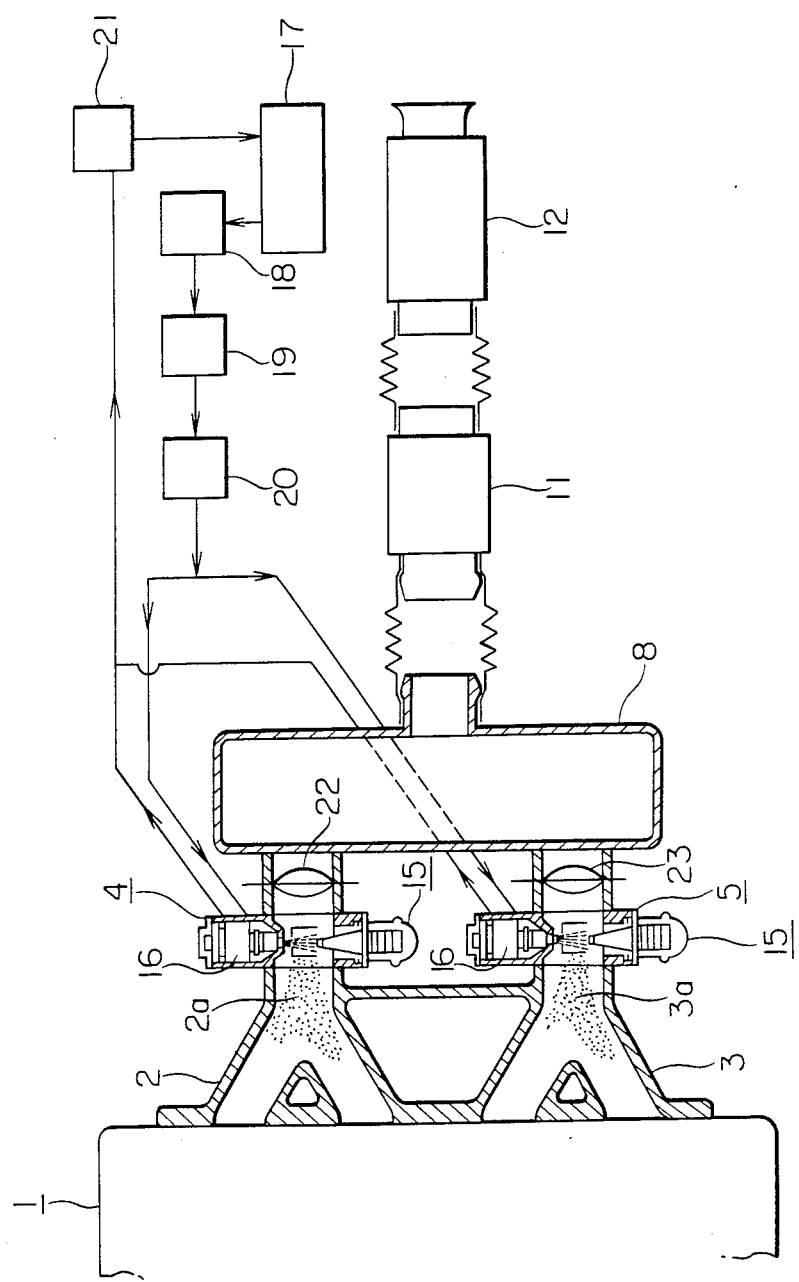
Figure 6:
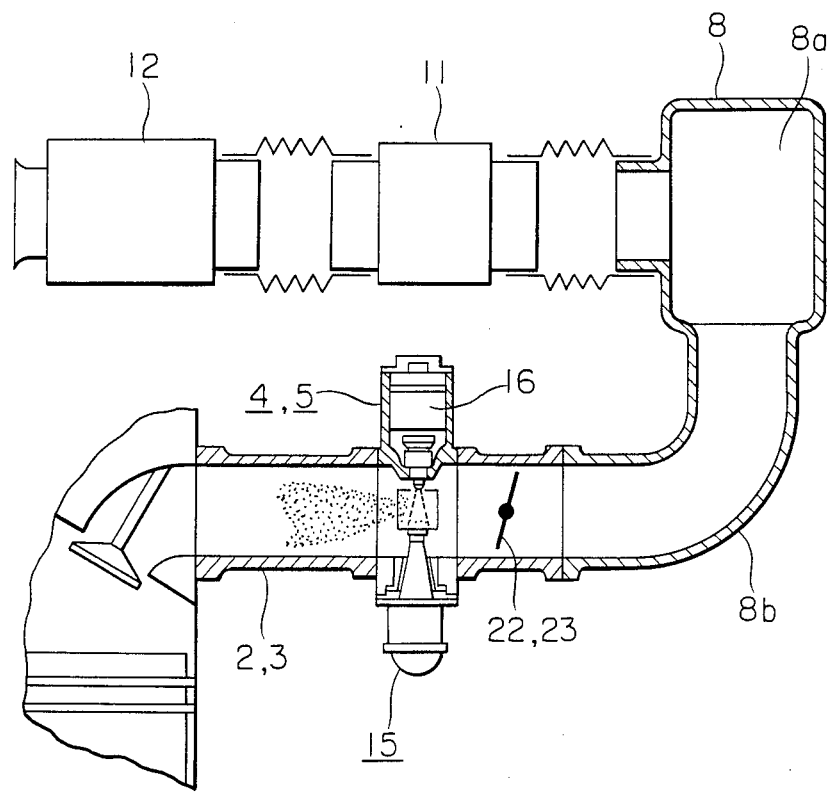

Referring to FIG. 5, there is shown another modified embodiment of the invention which differs from the first embodiment only in that, instead of the single throttling valve 9 disposed upstream of the passage collector member 8 in the first embodiment, the first and second throttling valves 22, 23 are disposed just upstream of the first and second fuel supply means 4, 5 respectively. Both the throttling valves 22, 23 are mutually synchronized when they are caused to operate. Also, it is possible in this embodiment to change, as is shown in FIG. 6, by the location of the passage collector member 8, the direction of the intake passage extending from the intake manifolds 2, 3 to the air cleaner 12 while assuring the same effect as in the case shown in FIG. 4 relative to the first embodiment in FIG. 1.

According to the present invention, when compared with the prior art multi-point fuel injection system, the fuel injection valves are less in the number so that the overall cost is reduced, and additionally, fuel injected from the fuel injection valves is caused to instantaneously atomized with the aid of the atomizing devices so that an uniformly distributed density of fuel can easily be achieved with respect to air. Besides, due to the disposition of the properly dimensioned length of the intake manifolds extending from the fuel injection valves up to the combustion chamber, an uniform fuel density distribution relative to air is assured prior to entry of fuel into the combustion chamber, which contributes to provision of effects such as betterment of combustion, improvement in thermal efficiency and economy of fuel consumption.

Moreover, the present invention provides a further effect that, since half the total cylinders are collectively dealt with by one set comprising an intake manifold, a fuel injection valve, an atomizing device and a throttling valve, air-fuel ratio imbalance between the respective cylinders can be made smaller in comparison with that in a single-point fuel injection system. In the case where four cylinders are in use, for instance, the first and second cylinders and the third and fourth cylinders are separately grouped to constitute respective packages and independently dealt with so that air-fuel ratio imbalance between the respective cylinders is, if any, in smaller degree than where all cylinders are dealt with as a single package, and in case that imbalance of air-fuel ratios should occur, it can easily be remedied only by modifying the configuration, dimension or the like of the related passages. More particularly, since only two cylinders are dealt with as a package, such imbalance which has occurred between said two cylinders can be eliminated with extreme easiness merely by altering passage resistance within the intake passage leading to one of the two cylinders.

Furthermore, since fuel injected from each fuel injection valve is atomized almost at the central portion of each intake passage, the fuel is prevented from sticking to the inner wall surface of the intake manifold, which results in improved responsiveness and also improved operating performance. In addition, due to the fact that each intake passage exending from its related intake manifold up to the fuel supply means is arranged to take an approximately horizontal posture, air stream is rendered smooth and this in turn helps achieve a further improvement in responsiveness and operating performance.

What is claimed is:

1. A fuel injection supply system for an internal combustion engine having an even number of more than four cylinders, an intake throttling valve means disposed in an intake passage substantially midway between each combustion chamber intake port and air cleaner outlet, a first intake manifold connected to a first cylinder group comprising one half of all of the cylinders, a second intake manifold connected to a second cylinder group comprising the other half of said cylinder, a passage collector means for collecting the intake passages so as to communicate the intake ports of said first and second manifolds with each other, a first fuel supply means disposed at a converging portion of the first intake manifold and a second fuel supply means disposed at a converging portion of the second manifold, wherein said of said first and second fuel supply means comprises a fuel injection valve, a fuel atomizing means including a tubular hollow vibrating piece, a vibrating driver means and a horn means for connecting said vibrating piece with said vibrating driver means, a cylindrical intake pipe member forming a part of said intake passage and having a hole for accommodating said horn member, a cylindrical housing extending radially outwardly of said cylindrical intake pipe member for receiving said fuel injection valve means, said cylindrical housing having a fuel injection aperture at the bottom thereof for enabling a passing of fuel into said cylindrical pipe member, and fuel passage means for respectively supply fuel thereto and returning fuel therefrom, said vibrating driver means being mounted on an outer surface of said pipe member for locating said vibrating piece at a central portion of said pipe member opposite to said fuel injection aperture.

2. A fuel injection supply system as defined in claim 1, characterized in that the intake passages in the first and second intake manifolds and in the first and second fuel supply means are disposed almost horizontally.

3. A fuel injection supply system as defined in claim 1, wherein said throttling valve means is located upstream of said passage collector means.

4. A fuel injection supply system as defined in claim 1, wherein said throttling valve means are located in passages between said passage collector means and each of said first and second fuel supply means.

5. A fuel injection supply system as defined in claim 2, wherein the intake passage has the direction thereof changed by the disposition of the passage collector means.

6. A fuel injection supply system as defined in claim 1 characterized in that each of said first and second fuel supply means have an atomizing means mounted thereto, each of said atomizing means includes a tubular hollow vibration piece positioned substantially at the central portion of the intake passage, and a fuel injection valve adapted to inject fuel in a direction substantially at right angles to the axis of the vibrating tubular piece.

7. A fuel injection supply system as defined in claim 1, wherein said vibrating piece is provided with an aperture disposed in opposition to said fuel injection aperture for passing the injected fuel therethrough into said vibrating piece.

* * * * *

UNITED STATES PATENT AND TRADEMARK OFFICE
CERTIFICATE OF CORRECTION

PATENT NO. : 4,716,879

DATED : January 5, 1988

INVENTOR(S) : Teruo TAKAYAMA and Teruo YAMAUCHI

It is certified that error appears in the above-identified patent and that said Letters Patent is hereby corrected as shown below:

On the Cover Page: The Foreign Application Priority Data was not entered and should appear as follows:

[30] Foreign Application Priority Data

--Mar. 29, 1985 [JP] Japan 60-63651--

Signed and Sealed this

Twenty-fourth Day of January, 1989

Attest:

DONALD J. QUIGG

*Attesting Officer*  *Commissioner of Patents and Trademarks*